(12) United States Patent
Sankrithi

(10) Patent No.: US 10,093,406 B2
(45) Date of Patent: Oct. 9, 2018

(54) AIRCRAFT FRAME FOR TAILSTRIKE ANGLE ENHANCEMENT

(71) Applicant: The Boeing Company, Chicago, IL (US)

(72) Inventor: Mithra Sankrithi, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 778 days.

(21) Appl. No.: 14/565,892

(22) Filed: Dec. 10, 2014

(65) Prior Publication Data

US 2016/0311512 A1 Oct. 27, 2016

(51) Int. Cl.
*B64C 1/06* (2006.01)
*B64C 1/00* (2006.01)
*B64C 25/00* (2006.01)

(52) U.S. Cl.
CPC ............ *B64C 1/061* (2013.01); *B64C 1/0009* (2013.01); *B64C 1/069* (2013.01); *B64C 2025/005* (2013.01)

(58) Field of Classification Search
CPC ......... B64C 1/061; B64C 1/068; B64C 1/069; B64C 1/0009; B64C 1/12
See application file for complete search history.

(56) References Cited

U.S. PATENT DOCUMENTS

| | | | |
|---|---|---|---|
| 2,134,260 A * | 10/1938 | Nickerson | B64C 1/061 244/119 |
| 4,310,132 A | 1/1982 | Robinson et al. | |
| 4,811,540 A * | 3/1989 | Kallies | B29D 99/0014 244/123.3 |
| 5,024,399 A * | 6/1991 | Barquet | B29C 70/44 244/119 |
| 5,171,510 A * | 12/1992 | Barquet | B29C 70/44 156/173 |
| 5,992,797 A | 11/1999 | Seidel et al. | |
| 7,621,482 B2 | 11/2009 | Sankrithi et al. | |
| 7,775,478 B2 | 8/2010 | Wood et al. | |
| 8,317,134 B2 | 11/2012 | Beumler | |
| 8,349,105 B2 | 1/2013 | Kehrl et al. | |
| 8,418,963 B2 * | 4/2013 | Arevalo Rodriguez | B64C 1/10 244/119 |
| 8,534,605 B2 | 9/2013 | Haack | |

(Continued)

OTHER PUBLICATIONS

Commercial Aircraft Corporation of China, Ltd., ARJ21-700, http://www.coman.cc/xw/zhxwby/201308/02/t20130802_1013966.shtml, Aug. 2, 2013.

(Continued)

*Primary Examiner* — Michael Wang
(74) *Attorney, Agent, or Firm* — Ostrager Chong Flaherty & Broitman PC

(57) ABSTRACT

A wedge frame for an aircraft that provides tailstrike angle enhancement. The wedge frame has converging, non-parallel faceplanes that tilt a rear portion of the aircraft fuselage upward in order to prevent or reduce risk of the tail of the aircraft striking the ground during takeoff and landing. A method to prevent or reduce risk of the rear portion of an aircraft from striking the ground during takeoff and landing by using a wedge frame having converging, non-parallel faceplanes to tilt upward the rear portion of the aircraft.

24 Claims, 10 Drawing Sheets

(56) References Cited

U.S. PATENT DOCUMENTS

| | | | | |
|---|---|---|---|---|
| 8,695,922 | B2 | 4/2014 | Schroeer et al. | |
| 8,844,871 | B2 | 9/2014 | Fernandez et al. | |
| 8,985,512 | B1* | 3/2015 | Chan | B64C 1/061 244/120 |
| 2008/0210819 | A1* | 9/2008 | Jarsaillon | B64C 1/068 244/120 |
| 2012/0006940 | A1* | 1/2012 | Mialhe | B64C 1/068 244/117 R |
| 2012/0104170 | A1* | 5/2012 | Gallant | B64C 1/061 244/132 |
| 2012/0186062 | A1* | 7/2012 | Vera Villares | B64C 1/069 29/428 |
| 2013/0216850 | A1* | 8/2013 | Vichniakov | B64C 1/061 428/573 |
| 2013/0295322 | A1* | 11/2013 | Dolzinski | B64C 1/061 428/119 |
| 2013/0334368 | A1 | 12/2013 | Sankrithi et al. | |
| 2014/0166811 | A1* | 6/2014 | Roming | B64C 1/061 244/131 |
| 2014/0209743 | A1* | 7/2014 | Boyen | B29C 67/0051 244/120 |
| 2015/0225065 | A1* | 8/2015 | Brunner | B64C 1/12 244/131 |

OTHER PUBLICATIONS

Aeronautical World Airliners, Boeing 737 USA-1968, http://www.aer.ita.br/~bmattos/mundo/country/usa/boeing-737.html,Nov. 24, 2014.
Aviation Week, Boeing's Baby Jetliner-Five Decades of Growth, http://aviationweek.com/blog/boeing-s-baby-jetliner-five-decades-growth, Sep. 8, 2014.
DAC MDC Boeing Retirees, The Douglas DC-8 Super Sixties, http://www.macdacwestretirees.org/DC-8-60.html, Nov. 26, 2014.
Planecrazy.ME.UK, Douglas DC-8-60/70, http://www.planecrazy.me.uk/html/douglas_dc-8-60.html, Nov. 24, 2014.
Nicholas C. Bellinger, Residual Life Assessment of Corroded Lap Joints, DTD Handbook, http://www.afgrow.net/applications/DTD handbook/examples/page3_1.aspx, Sep. 18, 2014.
Plane Truth, Fatigue Details, http://plane-truth.com/fatigue_details.htm, Jan. 26, 2004.
Fachhochschule Nordwestschweiz, Thin-Walled Composite Structures with Improved Damping Properties by using Natural Fibre Composites and Thin Ply Carbon Fibre Technology (TwiCDamp), http://www.fhnw.ch/technik/ikt/forschung/aktuelle-projekte, Nov. 23, 2014.
Steven M. Huybrechts, et al., Grid Stiffened Structures: A Survey of Fabrication, Analysis and Design Methods, http://www.iccm-central.org/Proceedings/ICCM12proceedings/site/papers/pap357.pdf.
Honda Worldwide, HondaJet, http://world.honda.com/HondaJet/innovation/03/, 9/18/24.
NBC News, Made in America: Boeing 737- Slideshows and Picture Stories-NBCNews.com, htttp://www.nbcnews.com/id/36811238/displaymode/1247?beginSlide=1, Nov. 24, 2014.
Legends in Their Own Time, Skeleton View of Part of B-29 Superfortress Fuselage, http://legendsintheirowntime.com/Content/1944/B29_Av_sk_4410_stringers_p201_W.png, Nov. 24, 2014.
Wikipedia, Tailstrike, http://en.wikipedia.org/wiki/Tailstrike, Nov. 24, 2014.
Jeff Sloan, PRSEUS Preform for pressurized cabin walls, Composites World, http://www.compositesworld.com/articles/prseus-preform-for-pressurized-cabin-walls, Sep. 1, 2011.
Extended European Search Report dated May 10, 2016 in European Patent Application No. 151992274.0 (European counterpart of the instant U.S. patent application).

* cited by examiner

AIRCRAFT FRAME FOR TAILSTRIKE ANGLE ENHANCEMENT

TECHNICAL FIELD

This disclosure generally relates to aircraft structures for preventing or mitigating tailstrikes and, more particularly, to an aircraft frame that increases an aircraft's tailstrike angle.

BACKGROUND

The revenue generated by an aircraft is directly related to the number of passengers and the amount of cargo it can carry. The greater the passenger seating and cargo space, the greater the potential revenues. One method of increasing the passenger and cargo capacity of an existing aircraft design is to increase the length of its fuselage.

An aircraft fuselage has three main parts, a forward fuselage body, middle fuselage body and aft fuselage body each comprising one or more generally cylindrical shaped "sections". A section having a constant cross-section is called a "constant section" and is defined as existing where the size and geometry of the fuselage perimeter is substantially unchanged between longitudinally adjacent fuselage frames or other longitudinally adjacent fuselage perimeter structure. Exemplary shapes of "constant section" include circular, piecewise circular, elliptical and non-circular cross-section, with a right circular cylinder being one specific example. A section having a tapering cross-section like a cone, ellipsoid, catenoid or a spline surface of revolution or Bezier surface of revolution, for example, is a "tapered section". One or more constant sections are joined together with one or more tapered sections to form a complete fuselage.

The forward fuselage body or forward body comprises a tapered section containing a cockpit or flight deck and aircraft nose ("nose section") and a forward constant section. The middle fuselage body or middle body comprises a middle constant section to which the wings are typically attached using a wing-to-body join. The middle constant section also commonly includes a main landing gear wheel well or housing, for aircraft having retractable landing gear. The aft fuselage body or aft body comprises an aft constant section and a tapered section having a tail assembly or empennage ("tail section"). The bottom portion or underside of the tail section is typically curved upward or "upswept".

In order to create a longer or stretched aircraft, one or more constant sections, usually having a uniform length ("plug sections"), are typically inserted as plugs or length enhancements between the middle body and forward body and also between the middle body and aft body. The number of plugs used depends on the desired size and configuration of the stretched aircraft. Note that plugs are not necessarily structurally separate members, and may be structurally integral with either of the adjacent constant sections. One example of a stretched aircraft is the Boeing 737-900ER which is a stretched version of the older and shorter Boeing 737-700.

Stretching an aircraft reduces the tailstrike angle of the stretched aircraft. As used herein, the term "tailstrike" refers to an event in which the aft body of an aircraft, typically the tail section, strikes the runway during take-off or landing. The term "tailstrike angle" means the angle at which the aircraft's nose section is raised or pitched upward relative to a baseline angle, wherein a tailstrike (aft body or tailskid contact with the ground) will occur during takeoff and/or landing and with main landing gear oleos extended or compressed. The baseline angle can be horizontal or can be the fuselage reference angle with the aircraft resting on all its landing gear on the ground. A tailstrike can occur during takeoff if the pilot pulls up ("rotates") too rapidly or at too sharp an angle or at too low an airspeed, leading to the aft body of the aircraft hitting the runway. A tailstrike occurs during landing if the pilot raises the nose of the aircraft ("flares") too high when touching down on the runway, or lands at too low an airspeed. For example, the tailstrike angle of a Boeing 737-800 aircraft is just over 9 degrees with main gear oleo compressed and around 11 degrees with main gear oleo extended. An aircraft suffering a significant tailstrike may have to be inspected, repaired and certified flightworthy before it can return to service resulting in delay, repair costs and lost passenger and cargo revenue. Airlines can and do mitigate tailstrike risk on takeoff and landing by reducing the payload on particular aircraft missions, by artificially limiting the number of passengers or tonnage of revenue cargo—but this payload reduction causes a severe economic penalty.

The aerospace industry has several solutions for reducing the probability of the occurrence of a tailstrike or at least reducing the damage caused by a tailstrike. To prevent tailstrikes, stretched aircraft can be fitted with longer or semi-levered main landing gear or with tilting main landing gear bogies. However, this solution requires modifications to the landing gear or totally new landing gear. It may also require re-designing the wheel well to accept the modified or new landing gear. Physical tailskids can also be added to absorb shock and mitigate body damage in the event of a tailstrike. However, this adds undesirable weight to the aircraft. Also, this solution requires a re-design of the tail section. Aircraft can be fitted with an "electronic tailskid" or "supplemental electronic tailskid system" ("SETS") that applies flight control command inputs to the elevators to avoid tailstrike or reduce tailstrike closure rate (the angular rate at which the aft body approaches the ground surface) when conditions corresponding to an incipient tailstrike are detected by sensors and/or detection algorithms. However, this solution requires fitting complex sensors and electronic systems to the aircraft. This solution cannot readily be used by stretched aircraft that do not have fly-by-wire flight control systems.

It is therefore desirable to provide additional methods for reducing the probability of an aircraft suffering a tailstrike, which do not require extensive re-design or modification of an aircraft, that are less costly, and that can be used in aircraft not having a fly-by-wire system. It is also desirable to enable the aircraft to carry a larger payload on critical missions, without needing to reduce payload to keep tailstrike risk at an acceptable level.

SUMMARY

The foregoing purposes, as well as others that will be apparent, are achieved generally by an aircraft frame having a wedge shape ("wedge frame") that provides tailstrike angle enhancement to an aircraft and a method for providing tailstrike angle enhancement to an aircraft using a wedge frame. The wedge frame has upward angled forward and aft outboard flanges whose distal edges form converging or non-parallel faceplanes. The non-parallel faceplanes raise or kink the aft constant section of the aft body of the fuselage of an aircraft at an upward angle relative to the front body and/or middle body so as to provide "tailstrike angle enhancement". In one embodiment, the wedge frame is installed between the middle body and the aft body. In another embodiment, the wedge frame is installed between the front body and the middle body. In yet another embodiment, a first wedge frame is installed between the front and middle body and a second wedge frame is installed between the middle and aft body. As used herein, the term "tailstrike angle enhancement" means increasing the tailstrike angle of an aircraft.

BRIEF DESCRIPTION OF THE DRAWINGS

Various embodiments will be hereinafter described with reference to drawings for the purpose of illustrating the foregoing and other aspects of the disclosure.

DETAILED DESCRIPTION

In the following detailed description, various embodiments are described to illustrate the general principles of the present disclosure. It will be recognized by one skilled in the art that the present disclosure may be practiced in other analogous applications or environments and/or with other analogous or equivalent variations of the illustrative embodiments. It should also be noted that those methods, procedures, components, or functions which are commonly known to persons of ordinary skill in the field of the disclosure are not described in detail herein.

Figure 1:
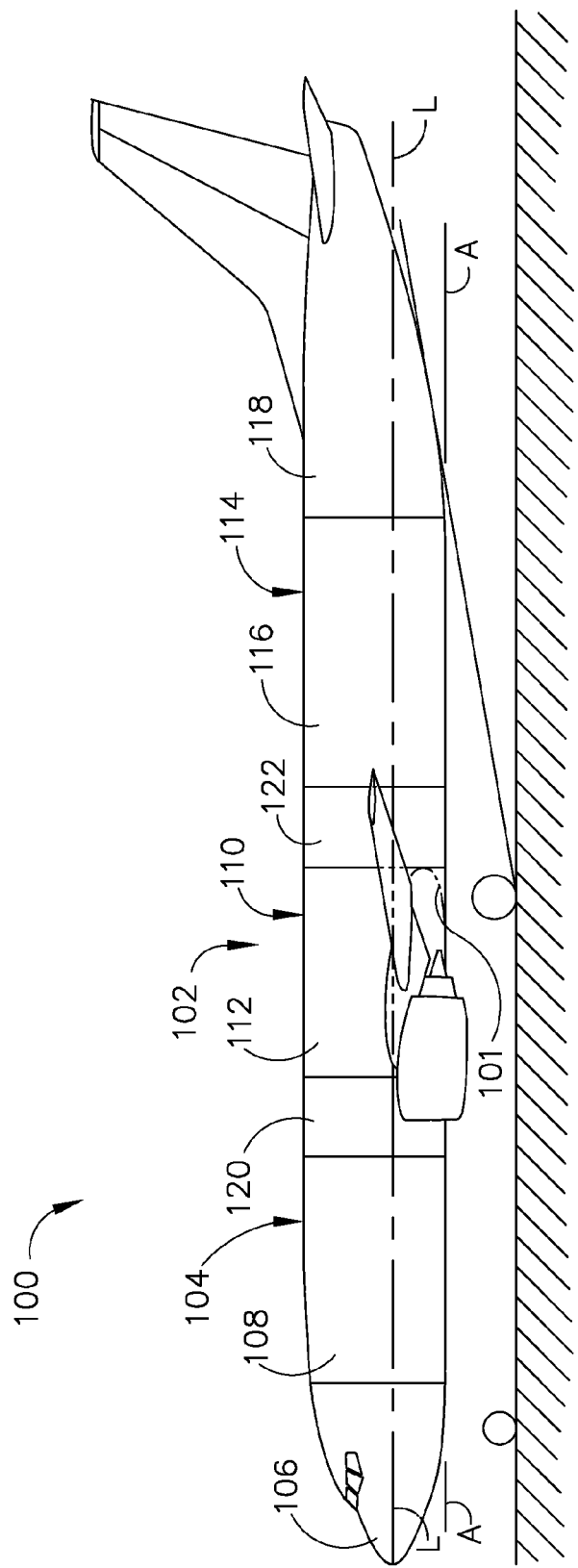
FIG. 1 is a diagrammatic representation of a left side view of a typical stretched aircraft.

A typical stretched aircraft 100 without any tailstrike angle enhancement is depicted in FIG. 1. The aircraft 100 has a fuselage 102 having a forward body 104 with a nose section 106 and a forward constant section 108, a middle body 110 with a middle constant section 112, and an aft body 114 with an aft constant section 116 and a tail section 118. A first plug section 120 is included in and forms part of forward constant section 108. A second plug section 122 is included in and forms part of aft constant section 116. It is to be understood that, as used herein, the terms "forward constant section" and "aft constant section" include any plug sections that are connected to the "forward constant section" or "aft constant section". The forward body 104, middle body 110 and aft body 114 are connected together so that forward constant section 108, middle body 110 and aft constant section 116 have outer cylindrical surfaces that are parallel to a horizontal axis A-A.

Each of the sections that make up the forward body 104, middle body 110 and aft body 114 generally comprises frames, stiffeners, and skin. The skin covers the frames and stiffeners and gives the aircraft its aerodynamic shape. The stiffeners (e.g. stringers or longerons) support the skin and run longitudinally along the fuselage. Frames maintain the cross sectional shape of the fuselage even when the fuselage is subject to various loads, such as pressurization loads and maneuvering loads. The frames also support stiffeners disposed generally along the longitudinal length of the fuselage. Frames are generally disposed perpendicular to the longitudinal axis of the fuselage. Typically, frames consist of a flat, ring-shaped or annular web with one or two flanges that run along the outboard or outer edge of the web like a rim. In one embodiment, one flange is disposed perpendicular to the web in a forward direction while the other flange is disposed perpendicular to the web in the opposite or aft direction. The distal edges of these two flanges form a pair of faces or faceplanes that are parallel to each other. Frames typically have load bearing stiffener mountings or attachment fitting architectures such as "mouse holes" or slots to receive and hold the stiffeners.

Figure 2A:
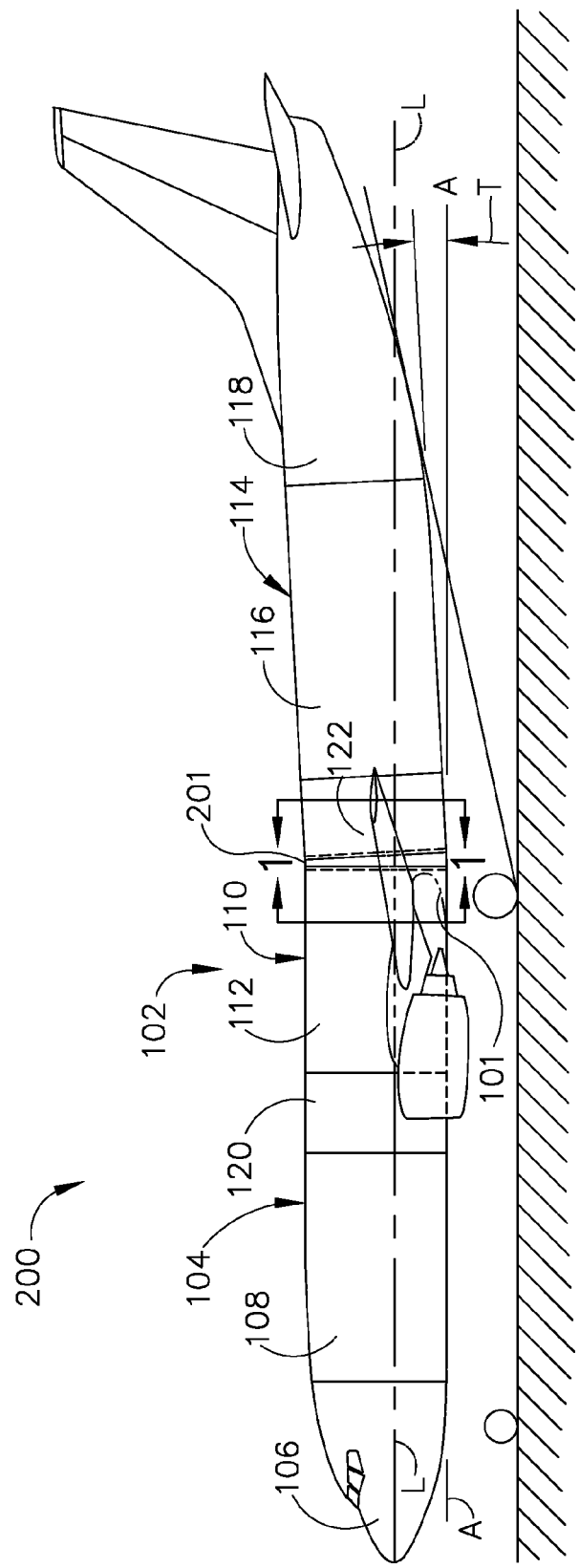
FIG. 2A is a diagrammatic representation of a left side view of a stretched aircraft with a wedge frame between the middle body and aft body.

In FIG. 2A, an embodiment of an aircraft 200 with tail-strike angle enhancement is shown with a wedge frame 201 between middle constant section 112 and second plug section 122 of aft constant section 116. Wedge frame 201 creates a bend or kink in fuselage 102 so that aft constant section 116 is tilted at a first upward angle T above horizontal axis A-A. This also raises tail section 118 upward by the same angle T. Consequently, aft constant section 116 and tail section 118 of aft body 114 are disposed at the first upward angle T relative to forward body 104. First upward angle T is the amount of tailstrike angle enhancement. The extent to which aft constant section 116 is tilted upward generally depends on the aircraft size and configuration, tailstrike angles with main gear oleos compressed and extended, and whether approach speed is more limited by stall speed or by pitch attitude limited by tailstrike risk. In one preferred embodiment, first upward angle T is between about one to about three degrees. During the cruise portion of a flight, an aircraft typically flies with a nose up or upward pitch attitude of about three degrees. Thus, when aft body 114 is tilted upward, the angle of the floor in the flight cabin in aft body 114 of aircraft 200 will improve because of first upward angle T.

It is preferable that wedge frame 201 be placed in a location of strength in the fuselage. In the embodiment shown in FIG. 2A, wedge frame 201 is located between middle body 110 and aft constant section 116 of aft body 114. This is a location of strength because it is adjacent to the location of the wheel well (not shown) and wing-to-fuselage join 101 which has a bulkhead that provides added structural strength. For example, the wedge frame may be located substantially at the longitudinal location of an aft wheelwell bulkhead; forward wheelwell bulkhead, wing rear spar attachment structure or wing front spar attachment structure.

Figure 2B:
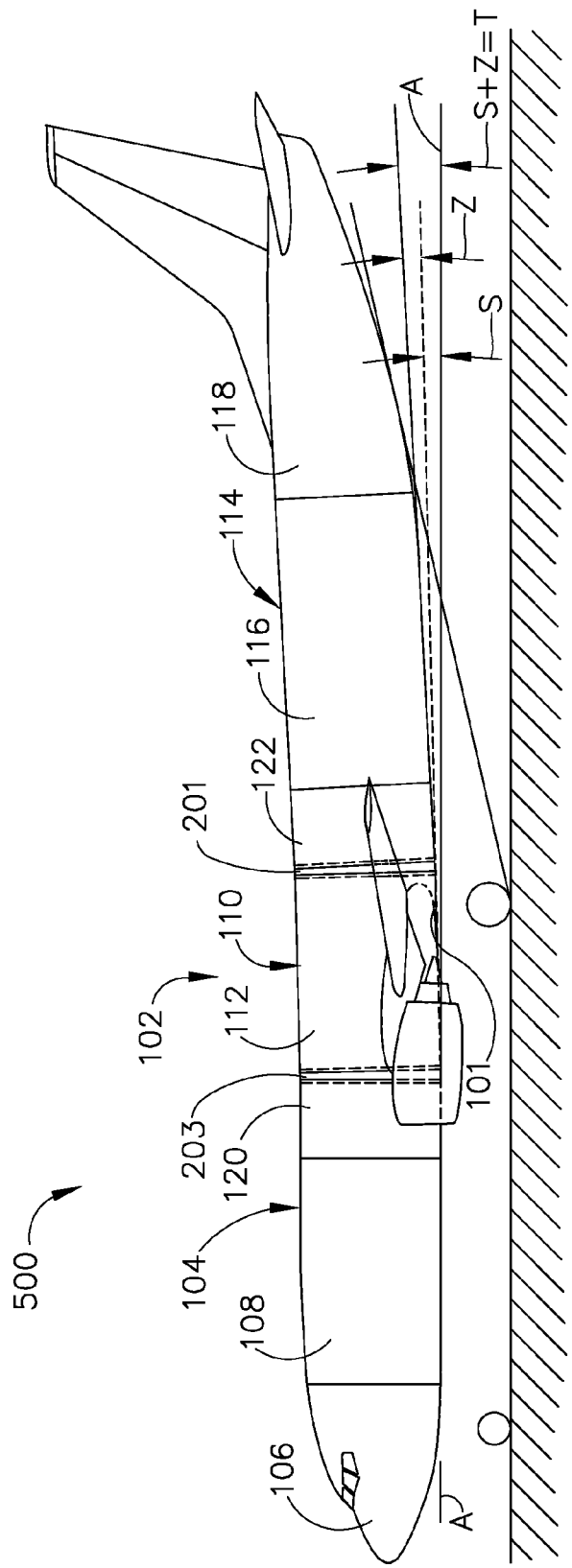
FIG. 2B is a diagrammatic representation of a left side view of a stretched aircraft with a first wedge frame between the forward body and middle body and a second wedge frame between the middle body and aft body.

In another embodiment (FIG. 2B), in addition to wedge frame 201, a second or forward wedge frame 203 is added to the fuselage. Forward wedge frame 203 connects middle constant section 112 to first plug section 120 of forward constant section 108 at a second upward angle S so that middle body 110 is disposed at the second upward angle S relative to forward body 104. Wedge frame 201 connects middle constant section 112 and second plug section 122 of aft constant section 116 at a third upward angle Z so that aft body 114 is disposed at the third upward angle Z relative to middle body 110 In this embodiment, a sum of the third upward angle Z and second upward angle S is the amount of tailstrike angle enhancement T. This sum of the angles is shown as S+Z=T. The sum of second upward angle S and third upward angle Z is preferably between about one to about three degrees. Preferably, second upward angle S is between about 1 to about 2 degrees and third upward angle Z is between about 1 to about 2 degrees.

Figure 2C:
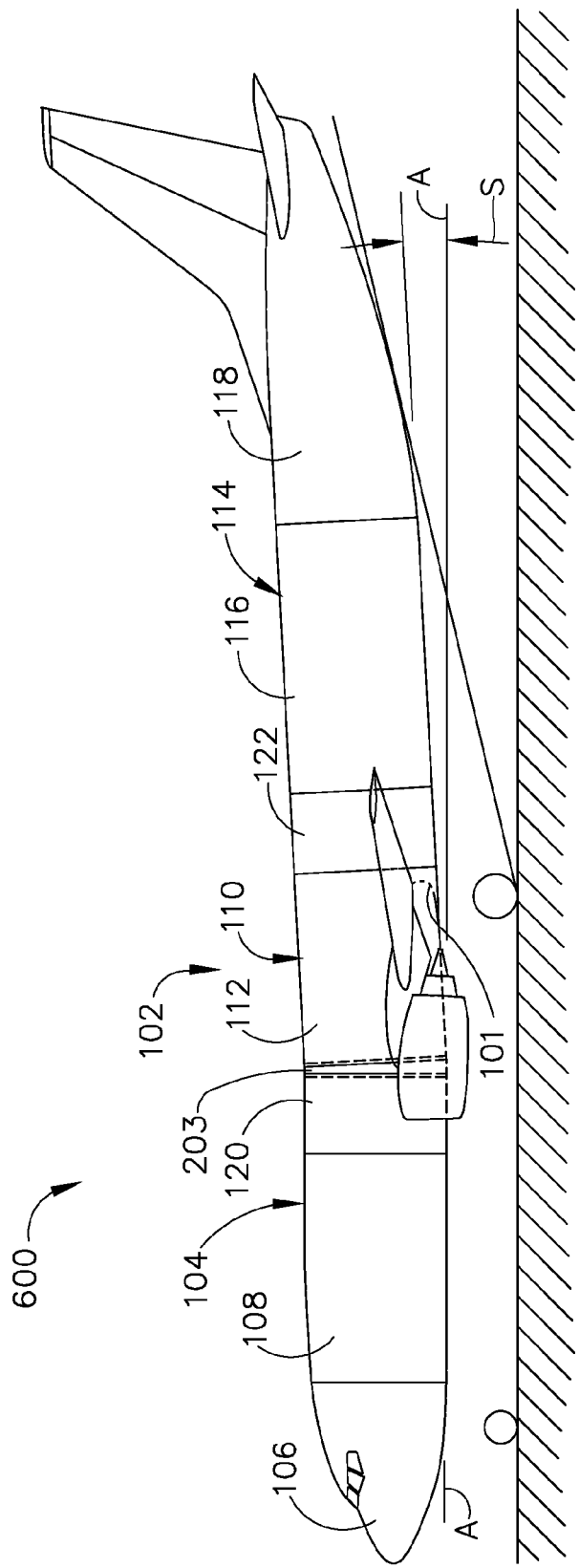
FIG. 2C is a diagrammatic representation of a left side view of a stretched aircraft with a wedge frame between the forward body and middle body.

In another embodiment (FIG. 2C), a wedge frame 203 connects middle constant section 112 to first plug section 120 of forward constant section 108 at the second upward angle S so that middle body 110 and aft body 114 are disposed at the second upward angle S relative to forward body 104. In this embodiment, second upward angle S is the amount of tailstrike angle enhancement, which is preferably between about one to about three degrees. The frame (not shown) between middle constant section 112 and second plug section 122 of aft constant section 116 is a typical frame with parallel faceplanes in this embodiment.

Figure 3:
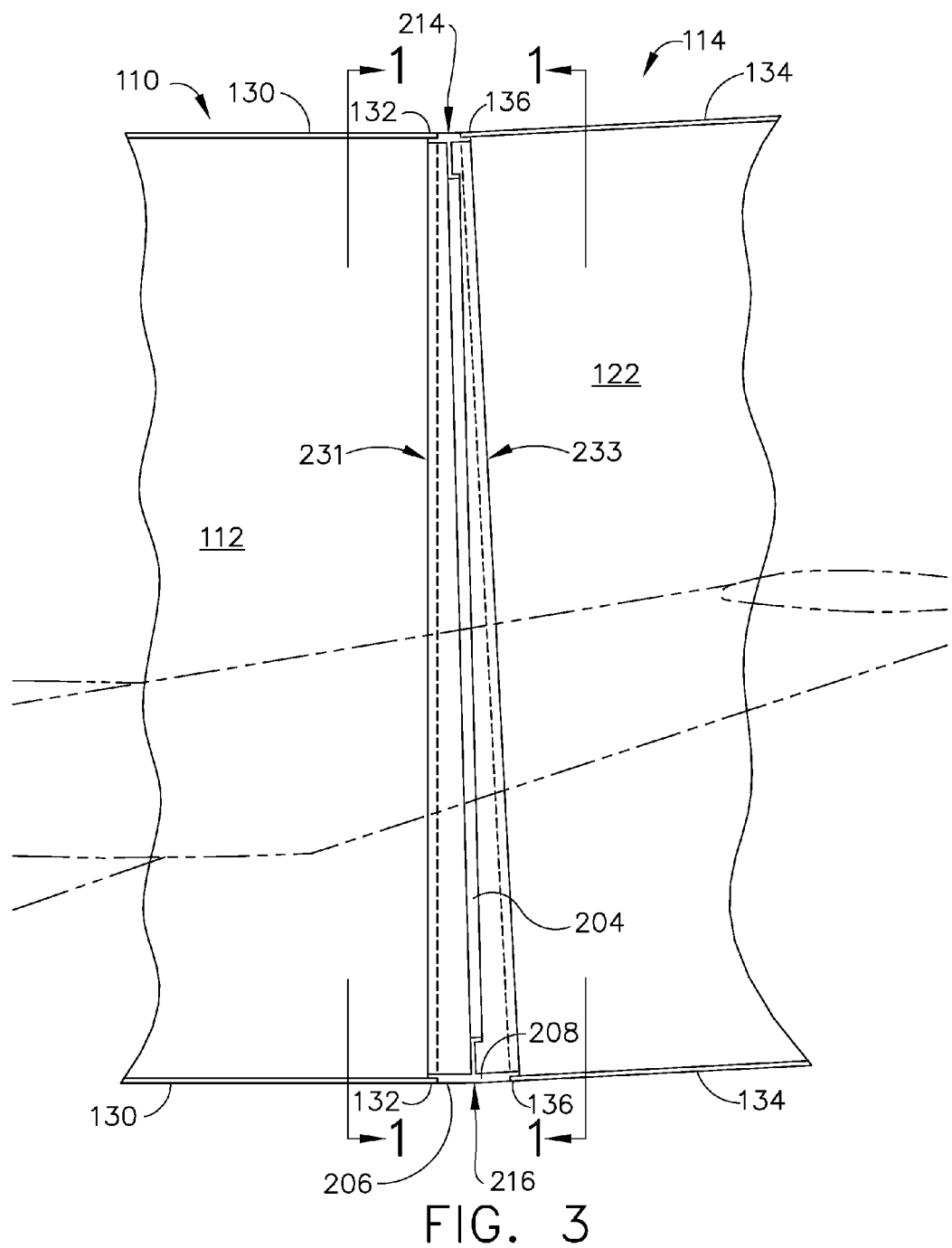
FIG. 3 is a diagrammatic representation of an enlarged partial, cross-sectional view of a wedge frame taken along the line 1-1 in FIG. 2A with phantom lines depicting a wing on the right side of the aircraft.
Figure 4:
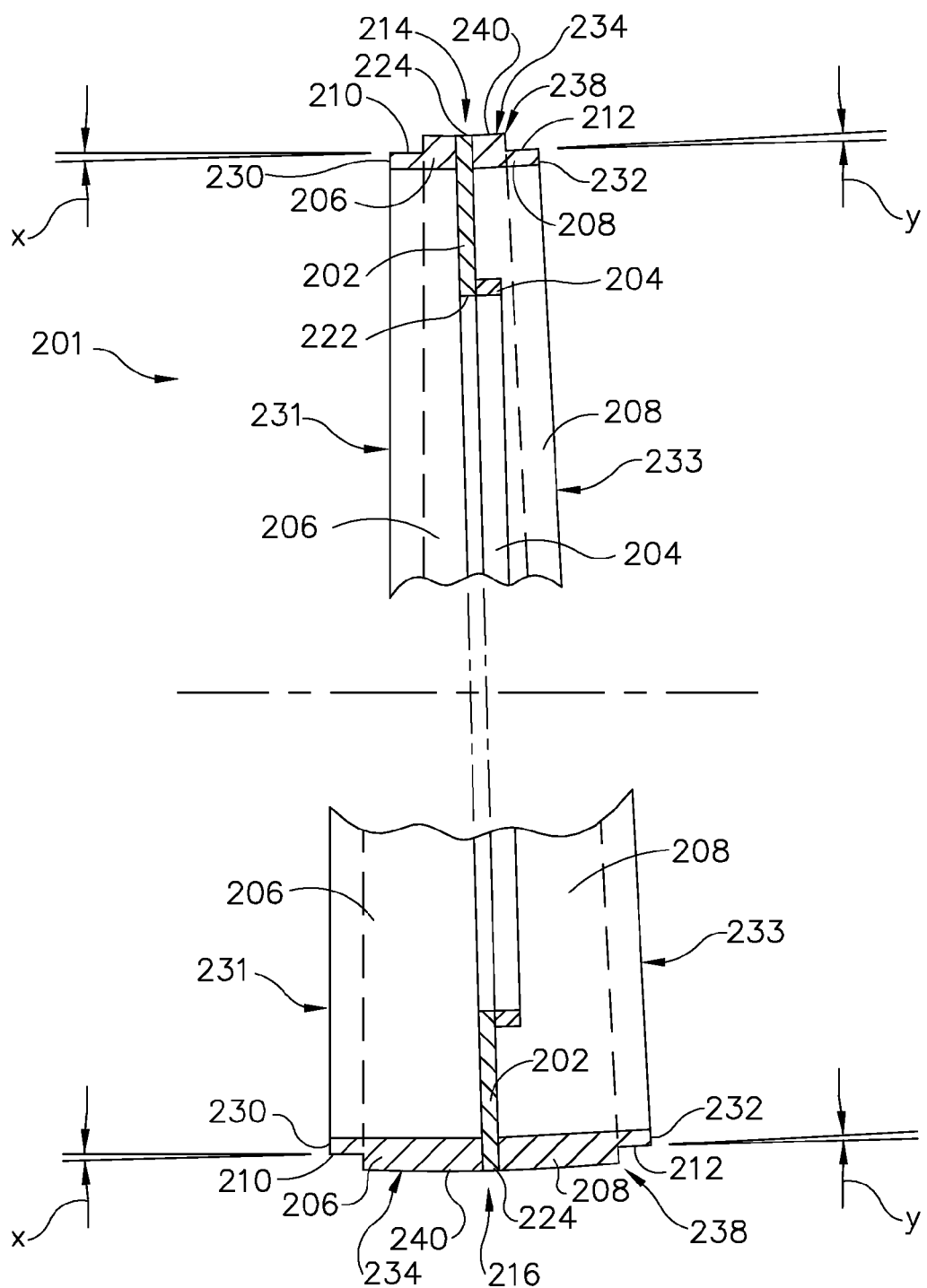
FIG. 4 is a diagrammatic representation of an enlarged view of the wedge frame shown in FIG. 3.
Figure 5:
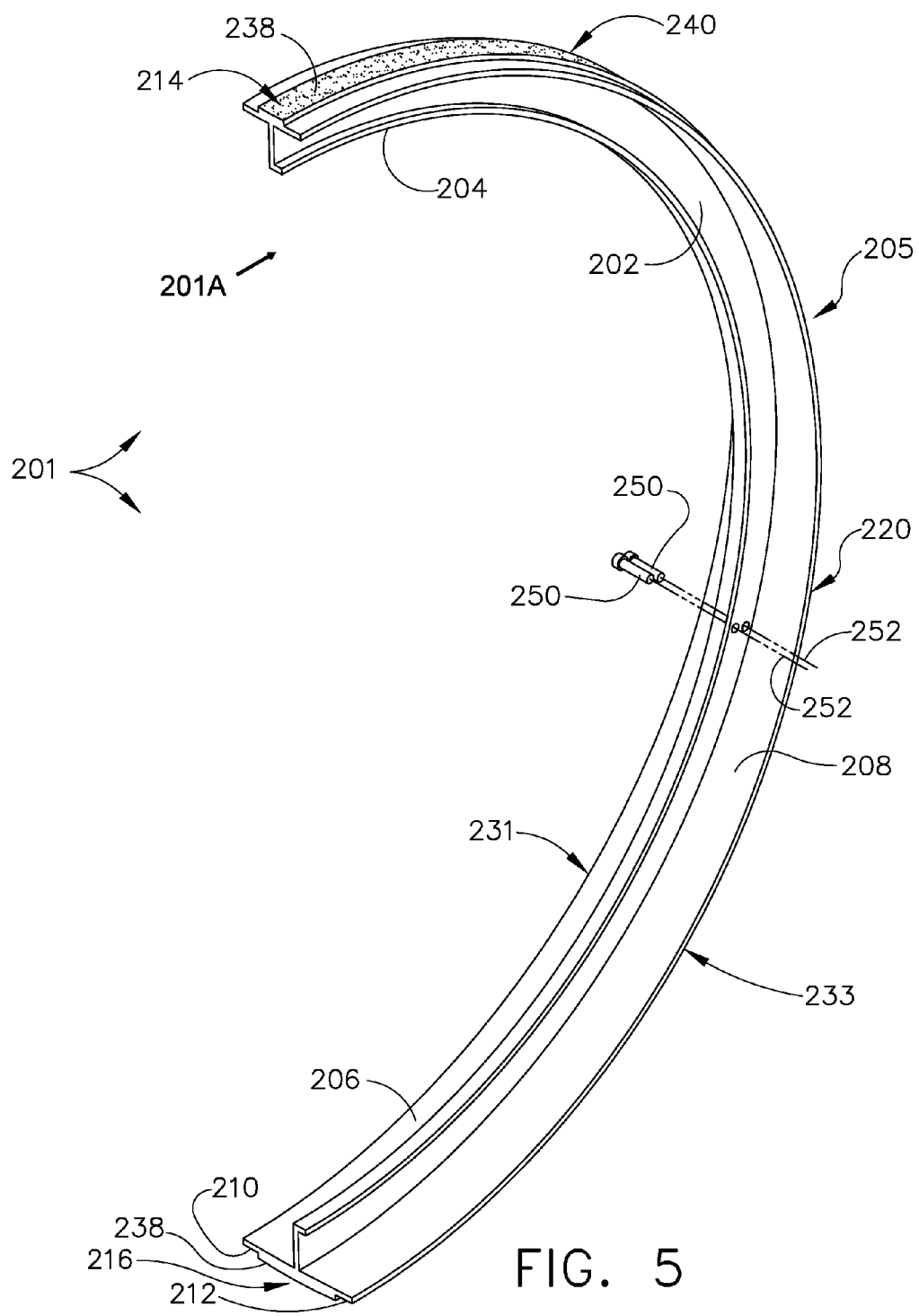
FIG. 5 is a diagrammatic representation of a perspective view of a vertical cross section of the wedge frame shown in FIG. 4.

As seen in FIGS. 3-5, wedge frame 201 and second wedge frame 203 are annular structures 201A with non-parallel forward and aft faceplanes 231, 233 formed by a forward distal edge 230 and an aft distal edge 232 of the annular structure 201A. A generally annular web 202 extends in an inboard direction from an annular outboard rim 205. Web 202 has an inboard rim 204 extending transversely from an inboard end 222 of web 202 in an aft direction, or alternatively, in a forward direction. Inboard rim 204 provides strength to web 202 and prevents inboard end 222 from bending, buckling or deforming excessively. Outboard rim 205 comprises a forward outboard flange 206 and an aft outboard flange 208 that extend laterally away from an outboard end 224 of web 202 towards forward distal edge 230 and aft distal edge 232 respectively. As used herein, the term "inboard" means located closer to a longitudinal axis L-L (FIG. 2A) of aircraft 200 and term "outboard" means located further from longitudinal axis L-L.

As best seen in FIG. 5 and explained in more detail below, forward outboard flange 206 and aft outboard flange 208 of outboard rim 205 flare or angle slightly outwards or in an outboard direction as they move from a bottom side 216 to a top side 214 of wedge frame 201. Referring to FIGS. 4-5, at bottom side 216 of wedge frame 201, forward outboard flange 206 and aft outboard flange 208 of outboard rim 205 are both slightly tilted upward. Forward outboard flange 206 is tilted slightly upward towards the longitudinal axis L-L at a first upward flange angle X while aft outboard flange 208 is slightly tilted upward towards the longitudinal axis L-L at a second upward flange angle Y. As forward outboard flange 206 and aft outboard flange 208 move upward from bottom side 216 to top side 214 of wedge frame 201, they each flare slightly outwards so that forward outboard flange 206 and aft outboard flange 208 become perpendicular to web 202 at a left and a right side 220 of wedge frame 201. When forward outboard flange 206 and aft outboard flange 208 reach top side 214 of wedge frame 201, forward outboard flange 206 becomes tilted upward and away from the longitudinal axis L-L at the first upward flange angle X and aft outboard flange 208 becomes tilted upward away from longitudinal axis L-L at the second upward flange angle Y. Thus, at bottom side 216 of wedge frame 201, first and second upward flange angles X, Y are upward angles oriented towards a center axis of wedge frame 201 while at top side 214 of wedge frame 201, first and second upward flange angles X, Y are upward angles oriented away from the center axis of wedge frame 201. First upward flange angle X and the second upward flange angle Y are both equal to approximately ½ of the tailstrike enhancement angle in some embodiments that utilize a single wedge frame 201, or about ¼ of the tailstrike enhancement angle in some embodiments that utilize two wedge frames. Preferably, the sum of the first upward flange angle X and the second upward flange angle Y is between about one to about three degrees, without limitation.

Referring to FIGS. 3-4, forward outboard flange 206 and aft outboard flange 208 have equal widths at bottom side 216 of wedge frame 201. The widths of forward outboard flange 206 and aft outboard flange 208 decreases by an equal amount as they move upward from bottom side 216 to top side 214 of wedge frame 201. Consequently, forward outboard flange 206 and aft outboard flange 208 are narrower at top side 214 than at bottom side 216 of wedge frame 201. As a result, forward and aft face planes 231, 233 are "converging", that is, non-parallel to each other so that a width of the wedge frame is smaller at top side 214 than a width at bottom side 216. These converging forward and aft face planes 231, 233 give wedge frame 201 a "wedge" shape. This is in contrast to the parallel faceplanes of typical aircraft frames as described above.

Referring to FIGS. 4-5, wedge frame 201 includes a forward skin channel 210 located on an outboard surface 234 of outboard rim 205 adjacent to and substantially parallel with forward distal edge 230. An aft skin channel 212 is located on outboard surface 234 of outboard rim 205 adjacent to and substantially parallel with aft distal edge 232. Preferably, forward skin channel 210 and aft skin channel 212 (FIGS. 3-4) have equal widths. Similarly, forward skin channel 210 and aft skin channel 212 preferably have equal depths.

Wedge frame 201 also includes an annulet or ring 238, located between forward skin channel 210 and aft skin channel 212, which encircles outboard rim 205. Outboard surface 234 of outboard rim 205 forms a top ring side 240 of ring 238. Ring 238 tapers or decreases in width as it moves from bottom side 216 to top side 214 of wedge frame 201. Consequently, ring 238 is wider at bottom side 216 than at top side 214 of wedge frame 201. At bottom side 216 of wedge frame 201, top ring side 240 of ring 238 is shaped as a smooth, aerodynamic outward convex spline or Bezier curve. As best seen in FIG. 5, top ring side 240 of ring 238 curves slightly inwards as it runs upward along outboard rim 205 of wedge frame 201 so that top ring side 240 of ring 238 is a substantially flat smooth aerodynamic surface at left side and right side 220 of wedge frame 201 and becomes a smooth aerodynamic inward concave spline or Bezier curve at top side 214 of wedge frame 201. Top ring side 240 of ring 238 is exposed to the airstream (see, FIGS. 3-4) and the smooth aerodynamic shape of top ring side 240 minimizes aerodynamic drag acting on aircraft 200. Preferably, top ring side 240 has an aerodynamic three-dimensional surface loft (FIG. 5) that acts to minimize aerodynamic drag. A three-dimensional surface loft is a complex smooth surface shape that cannot be described by a simple rotated two-dimensional shape, i.e. more complex than a cylinder or cone or ellipsoid or paraboloid, all of which are rotated two dimensional shapes.

Wedge frame 201 is connected to the skin of adjacent sections of the fuselage 102 using a lap join as a "skin joining means". Referring to FIGS. 3-4, middle constant section 112 comprises a middle cylindrical skin section 130 and has an aft skin edge 132. The aft constant section 116 comprises an aft cylindrical skin section 134 having a forward skin edge 136. Middle constant section 112 is connected to wedge frame 201 using a lap join by placing aft skin edge 132 over forward skin channel 210 of forward outboard flange 206 and then connecting aft skin edge 132 to forward outboard flange 206 using a connector means known in the aerospace industry such as one or more of fasteners, rivets, bolts, lugs, one-sided fasteners, bonding, bonded joints, stitching, stapling, welding, or gluing. Similarly, aft constant section 116 is connected to wedge frame 201 using a lap join by placing forward skin edge 136 over aft skin channel 212 of aft outboard flange 208 and then connecting forward skin edge 136 to aft outboard flange 208 using the connector means described above.

In another embodiment (not shown), wedge frame 201 has no forward and aft skin channels and no ring. In this embodiment, middle constant section 112 is connected to wedge frame 201 using a butt join as a skin joining means. In a butt join, aft skin edge 132 of middle cylindrical skin section 130 is placed over forward outboard flange 206. Aft skin edge 132 is then connected to forward outboard flange 206 using the connector means described above. Similarly, aft constant section 116 is connected to wedge frame 201 using a butt join by placing forward skin edge 136 of aft cylindrical skin section 134 over aft outboard flange 208 and then connecting forward skin edge 136 to aft outboard flange 208 using the connector means described above. In other embodiments (not shown), portions of the outboard surface of the outboard rim that are exposed to the air flow around the aircraft have an aerodynamic three-dimensional surface loft that minimizes aerodynamic drag. Alternative skin joining means to connect a wedge frame to the skin of adjacent sections of an aircraft fuselage are flanged joints, lap joints, butt joints and other skin joining means known in the aerospace industry used in combination with the connector means described above.

The wedge frame 201 may have stiffener mountings (not shown) on the web 202 to serve as load bearing mountings for stiffeners (e.g. stringers or longerons) of adjacent sections of fuselage 102. The stiffener mountings can be "mouse holes", slots, fastened attachment, bonded attachment or other means known in the aerospace industry as suitable stiffener mountings. In other embodiments (not shown), the wedge frame can be provided with various arrangements of stiffener mountings (e.g., slots only or mouse holes and slots) in combination with various arrangements of skin joining means.

Figure 6:
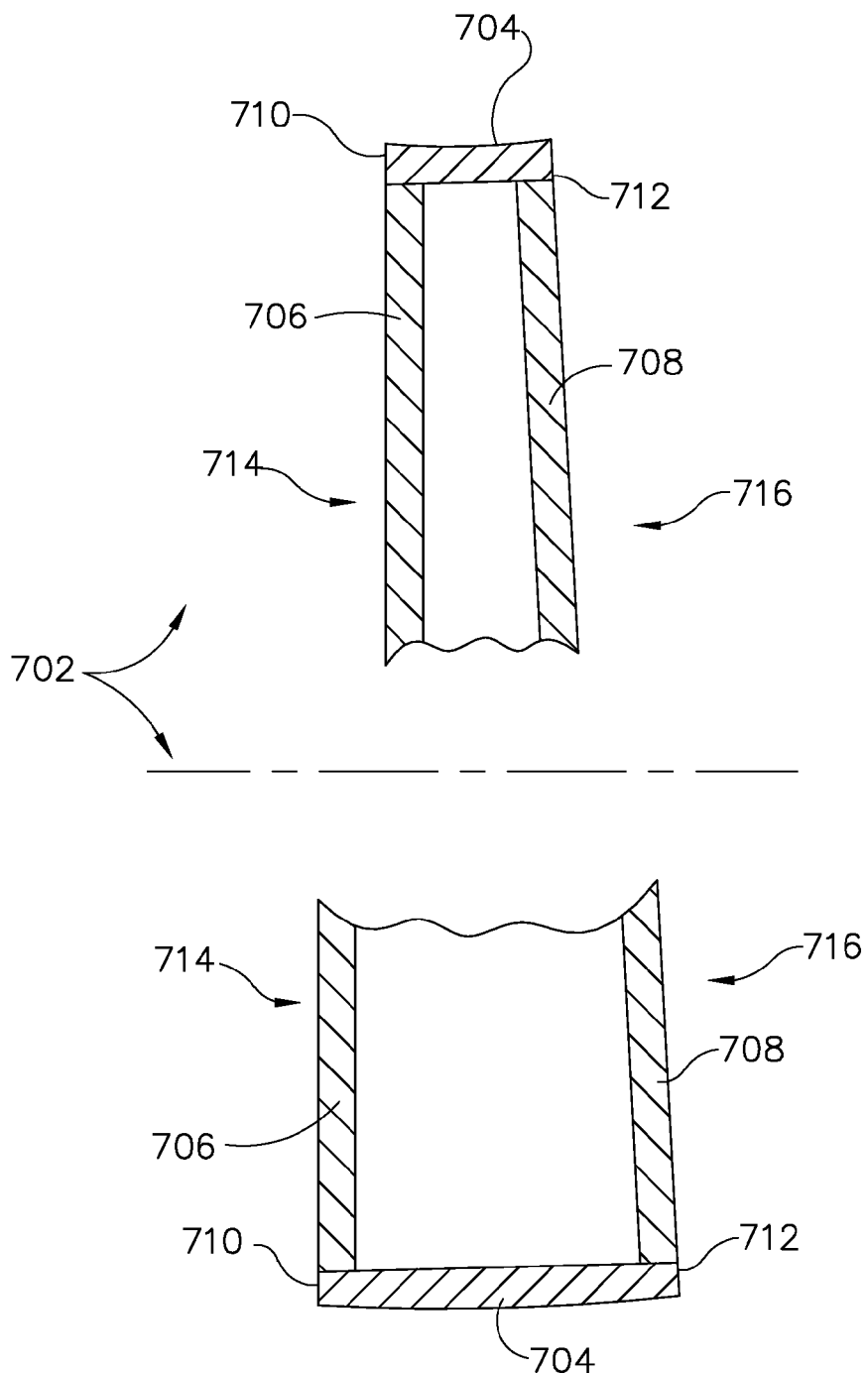
FIG. 6 is a diagrammatic representation of a cross-sectional view of an embodiment of a wedge frame.

In another embodiment (FIG. 6), a wedge frame 702 comprises an annular outboard rim 704 having a generally annular forward web 706 extending in an inboard direction from a forward distal edge 710 of outboard rim 704 and a generally annular aft web 708 extending in an inboard direction from an aft distal edge 712 of outboard rim 704. Similar to wedge frame 201 (see, FIGS. 3-4), wedge frame 702 has non-parallel forward and aft faceplanes 714, 716 formed by forward web 706 and aft web 708.

Figure 8:
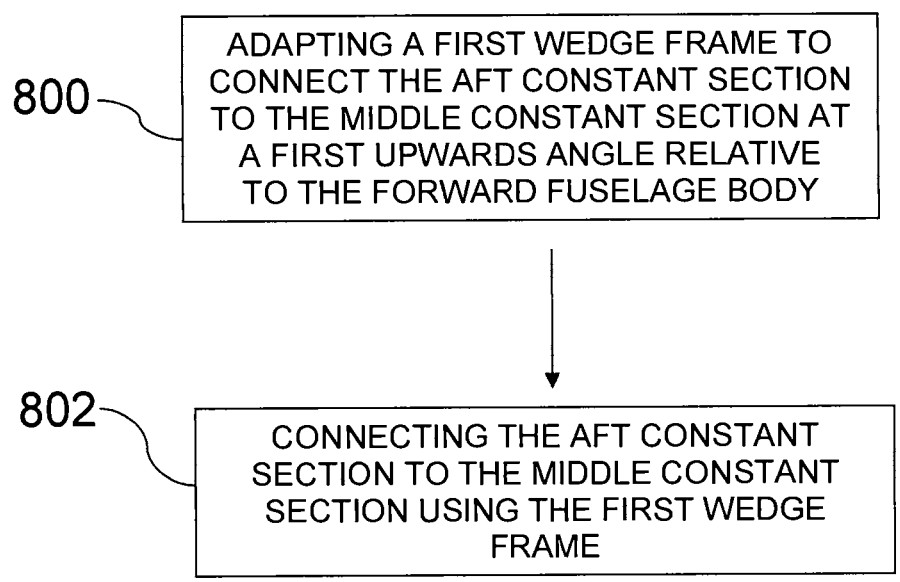
FIG. 8 is a flow chart illustrating the steps of a method for providing tailstrike angle enhancement to a stretched aircraft.

FIG. 8 illustrates a method for providing tailstrike angle enhancement to an aircraft comprising a forward fuselage body having a nose section and a forward constant section, a middle fuselage body having a middle constant section, and an aft fuselage body having an aft constant section and a tail section. In step 800 a first wedge frame for increasing a tailstrike angle is adapted to connect the aft constant section to the middle constant section at a first upward angle relative to the forward fuselage body. In step 802, the aft constant section is connected to the middle constant section using the first wedge frame so that the first wedge frame is installed between the aft constant section and the middle constant section. Preferably, the first upward angle is between about one to about three degrees.

The method also includes the optional step of adapting a second wedge frame to connect the middle constant section to the forward constant section at a second upward angle relative to the forward fuselage body and using the second wedge frame to connect the middle constant section to the forward constant section so that the second wedge frame is installed between the forward constant section and the middle constant section. The first wedge frame in this embodiment connects the aft fuselage body to the middle fuselage body at a third upward angle relative to the middle fuselage body. Preferably, the sum of the second upward angle and the third upward angle is between about one to about three degrees.

In the disclosed embodiments, the wedge frame is used to connect sections of aircraft fuselage that are composed of skin covering a frame and stiffeners structure. In other embodiments (not shown), the wedge frame is used in aircraft having other types of fuselage structures such as monocoque, semi-monocoque, honeycomb sandwich, isogrid, orthogrid, composite grid structures or advanced grid stiffened ("AGS") structures and hybrids such as a combination of a stiffened laminate structure with a faired transition to a sandwich structure.

Also, in the disclosed embodiments, the wedge frame is used to provide tailstrike enhancement to a stretched aircraft. In other embodiments, the wedge frame provides tailstrike angle enhancement to regular, that is, non-stretched aircraft, in circumstances wherein tailstrike angle enhancement is necessary or desired. For example, if the base model of a new aircraft design has short landing gear, a small wing incidence mounting angle, or long aft body, such a base model could also beneficially use the wedge frame.

The particular size, shape, dimensions, composition, weight, and method of manufacture of the wedge frame depends on several factors such as cost, size and configuration of the aircraft, low weight, ability to carry needed load conditions under normal, abnormal, emergency or damage scenarios, ease of manufacture, minimized intrusion into passenger or cargo payload volumes, ease of mating with skin, stiffeners or other structures in the fuselage, and ease of inspectability, maintainability and repairability.

The wedge frame can be fabricated as a single unitary structure or assembled from separate pieces using materials and methods known in the aerospace industry. Various type of material and structural architecture could be used for the wedge frame such as metal (e.g. alloys of aluminum, titanium, and steel), composites (e.g. carbon fiber reinforced plastic and fiberglass), hybrid (e.g. fiber metal laminates), and composites with laminate, sandwich, ply-tailoring, braiding, weaving or other features where these would be beneficial for a particular application. For example, the wedge frame can be machined or cast from aluminum or titanium. Alternatively, the wedge frame can be formed by laying up or ply-tailoring composite materials such as carbon fiber reinforced plastic (CFRP). Also, varied circumferential tailoring can be used by ply-tailoring composite materials to create a wedge frame. For example, some unidirectional plies or small angle (e.g. +/−3 degree) plies could be used around a circumference of the wedge frame to efficiently react pressurization loads.

Figure 7:
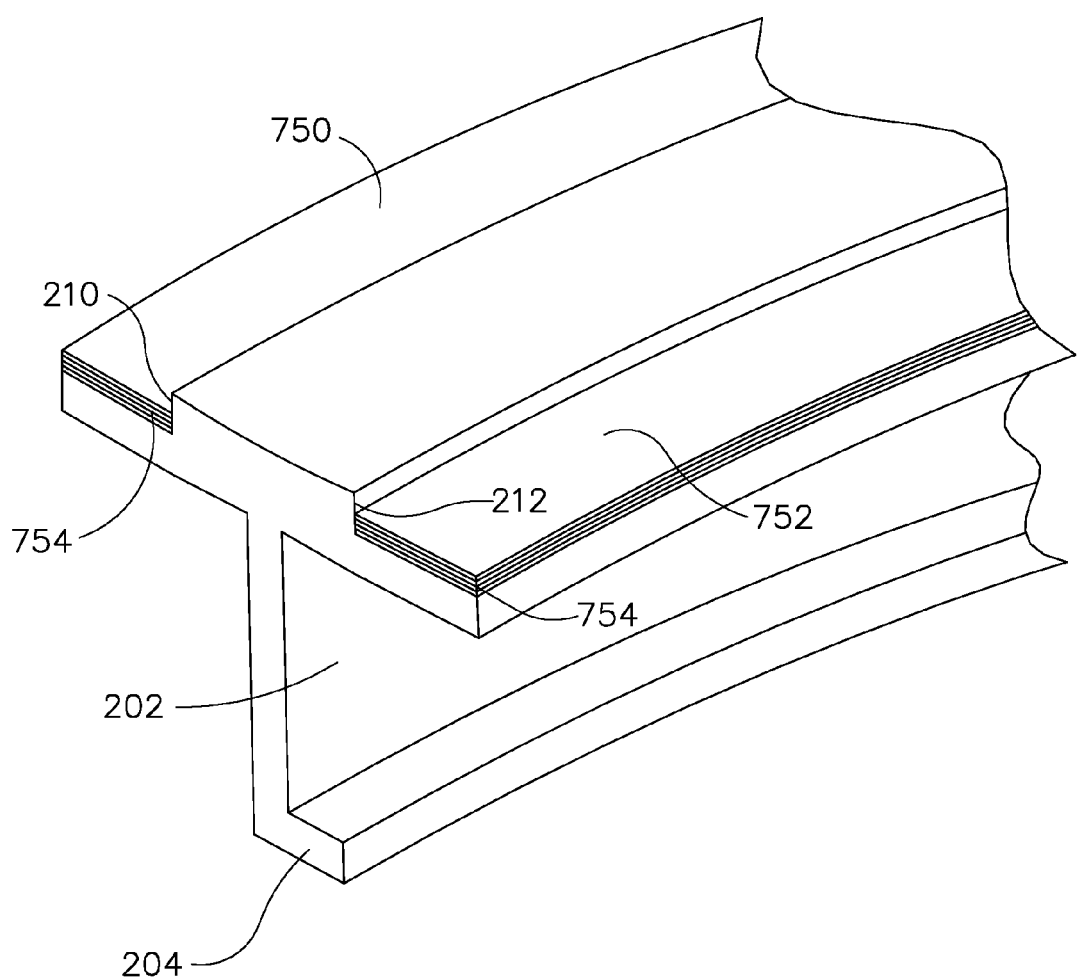
FIG. 7 is a diagrammatic representation of an enlarged perspective view of a top portion of a vertical cross section of another embodiment of a wedge frame.

In addition, the wedge frame can have structural tailoring to reduce the installed weight of the wedge frame. For example, the wedge frame may have structural tailoring located along a circumference of the wedge frame. As used herein, the term "structural tailoring" means intentional variation of structural attributes such as structural gage, localized pad-ups, localized stiffening, number of composite plies, ramp-down of composite plies in regions of reduced critical loads, angular orientations of composite plies, stacking sequence of composite ply layups, and other structural tailoring methods known in the art of optimized structural design for reduced weight, ease of manufacture and reduced cost. The term "structural tailoring" also includes circumferential optimization of (i) structural member dimension, (ii) structural member gage, (iii) structural member three-dimensional geometry, (iv) metallic material application, (v) composite material application, (vi) composite material ply layup angles, (vii) hybrid materials, (viii) composite fiber tailoring, (ix) stitched fiber application, (x) braided fiber application and (xi) optimized resin application which are all known in the aerospace industry. For example, in another embodiment (FIG. 7), wedge frame 201 of FIGS. 3-5 has structural tailoring 750, 752 in the form of composite material 754 such as carbon fiber reinforced plastic (CFRP) disposed in forward and aft skin channels 210, 212 so that structural tailoring 750, 752 is located in and goes around a circumference of wedge frame 201 in order to provide localized stiffening.

The wedge frame can also have frame cross sections for supporting structures within the aircraft fuselage such as the interior cabin floor and ceiling. Various frame cross sections can be utilized such as I, T, L, Z, flanged, rectangular, hat cross-sections and other frame cross sections known in the aerospace industry. Also, the wedge frame can have floor beam attachment means for attaching a floor beam to the wedge frame. A floor beam attachment means comprising a pair of bolts 250 which fit through bolt holes 252 is shown in FIG. 5. The floor beam in this embodiment may be adapted to accommodate an upward kink or angle in the interior cabin floor of the aft body corresponding to about the sum of first upward flange angle X and second upward flange angle Y. Other floor beam attachment means include attachments utilizing fasteners, bolts, rivets, welding, stir-welding or integral forming (e.g. machining, casting) with the frame and other floor beam attachment means known in the aerospace industry. Other examples of floor beam attachment means can be found in U.S. Pat. No. 7,775,478 B2 and "Thin-Walled Composite Structures with Improved Damping Properties by using Natural Fibre Composites and Thin Ply Carbon Fibre Technology (TwiCDamp)", Fachhochhschule Nordwestschweiz, available at http://www.fhnw.ch/technik/ikt/forschung/aktuelle-projekte.

While the disclosure has been described with reference to certain exemplary embodiments, such embodiments are for purposes of illustration and not limitation. It will be understood by those skilled in the art that various changes may be made and equivalents may be substituted for elements thereof without departing from the scope of the disclosure. In addition, many modifications may be made to adapt a particular situation to the teachings herein without departing from the essential scope thereof. Therefore it is intended that the claims not be limited to the particular embodiments disclosed. The method claims set forth hereinafter should not be construed to require that the steps recited therein be performed in alphabetical order or in the order in which they are recited, and should not be construed to exclude two or more steps being performed contemporaneously during at least a portion of the duration of one of said steps.

The invention claimed is:

1. A wedge frame that provides tailstrike angle enhancement for an aircraft having a fuselage, the wedge frame comprising an annular structure with a forward distal edge and an aft distal edge, the annular structure comprising a top section at a top of the fuselage with a first width from the forward distal edge to the aft distal edge that is smaller than a second width from the forward distal edge to the aft distal edge at a bottom section of the annular structure at a bottom of the fuselage.

2. The wedge frame of claim 1, wherein the annular structure further comprises:
   a generally annular web extending in an inboard direction from an annular outboard rim of the annular structure; and
   an inboard rim extending transversely from an inboard end of the web.

3. The wedge frame of claim 2, wherein the outboard rim comprises:
   a forward outboard flange extending laterally away from an outboard end of the web towards the forward distal edge, and disposed at a first upward flange angle with respect to the web at the bottom section and the top section of the annular structure; and
   an aft outboard flange extending laterally away from the outboard end of the web towards the aft distal edge, and disposed at a second upward flange angle with respect to the web at the bottom section and the top section of the annular structure.

4. The wedge frame of claim 3, wherein a sum of the first upward flange angle and the second upward flange angle is between about one to about three degrees.

5. The wedge frame of claim 3, wherein the first upward flange angle is equal to the second upward flange angle.

6. The wedge frame of claim 3, wherein at the bottom section of the annular structure, the first upward flange angle and the second upward flange angle are oriented towards a center axis of the wedge frame, and at the top section of the annular structure, the first upward flange angle and the second upward flange angle are oriented away from the center axis of the wedge frame.

7. The wedge frame of claim 3, further comprising:
   a forward skin channel located on an outboard surface of the outboard rim adjacent to and substantially parallel with the forward distal edge; and
   an aft skin channel located on the outboard surface of the outboard rim adjacent to and substantially parallel with the aft distal edge.

8. The wedge frame of claim 7, further comprising:
   a ring located between the forward skin channel and the aft skin channel, said ring encircling the outboard rim.

9. The wedge frame of claim 2, further comprising a floor beam attachment means for attaching a floor beam to the wedge frame.

10. The wedge frame of claim 2, further comprising structural tailoring located along a circumference of the wedge frame.

11. The wedge frame of claim 1, wherein the wedge frame comprises an outboard surface having an aerodynamic three-dimensional surface loft.

12. An aircraft comprising:
   a fuselage having a forward body, a middle body and an aft body, the forward body having a nose section and a forward constant section, the middle body having a middle constant section, and the aft body having an aft constant section and a tail section; and a wedge frame comprising an annular structure with a forward distal edge and an aft distal edge positioned in the aircraft such that the aft constant section of the aft body is disposed at a first upward angle relative to the forward body, the annular structure comprising a top section at a top of the fuselage with a first width from the forward distal edge to the aft distal edge that is smaller than a second width from the forward distal edge to the aft distal edge at a bottom section of the annular structure at a bottom of the fuselage.

13. The aircraft of claim 12, wherein the first upward angle is between about one to about three degrees.

14. The aircraft of claim 12, wherein the wedge frame is disposed between the aft body and the middle body to connect the aft constant section to the middle constant section at the first upward angle.

15. The aircraft of claim 14, wherein the first upward angle is between about one to about three degrees.

16. The aircraft of claim 14, further comprising a second wedge frame disposed between the forward body and the middle body to connect the middle constant section to the forward constant section at a second upward angle relative to the forward body.

17. The aircraft of claim 16, wherein a sum of the first upward angle and the second upward angle is between about one to about three degrees.

18. The aircraft of claim 12, wherein the wedge frame is disposed between the forward body and the middle body to connect the middle constant section to the forward constant section at the first upward angle.

19. The aircraft of claim 18, wherein the first upward angle is between about one to about three degrees.

20. A method for providing tailstrike angle enhancement to an aircraft having a forward fuselage body having a nose section and a forward constant section, a middle fuselage body having a middle constant section, and an aft fuselage body having an aft constant section and a tail section, the method comprising:

adapting a first wedge frame comprising an annular structure with a forward distal edge and an aft distal edge and an annular outboard rim having a top section at a top of the fuselage with a first width from the forward distal edge to the aft distal edge that is smaller than a second width form the forward distal edge to the aft distal edge at a bottom section of the annular outboard rim at a bottom side of the fuselage to connect the aft constant section to the middle constant section at a first upward angle relative to the forward fuselage body; and connecting the aft constant section to the middle constant section using the first wedge frame.

21. The method of claim 20, wherein the first upward angle is between about one to about three degrees.

22. The method of claim 20, further comprising:

adapting a second wedge frame to connect the middle constant section to the forward constant section at a second upward angle relative to the forward fuselage body; and connecting the middle constant section to the forward constant section using the second wedge frame.

23. The method of claim 22, wherein a sum of the first upward angle and the second upward angle is between about one to about three degrees.

24. A wedge frame that provides tailstrike angle enhancement for an aircraft, the wedge frame comprising an annular structure with non-parallel faceplanes formed by a forward distal edge and an aft distal edge of the annular structure, the annular structure comprising an annular outboard rim and a generally annular web extending in an inboard direction from the annular outboard rim, the annular outboard rim comprising:

a forward outboard flange extending laterally away from an outboard end of the web towards the forward distal edge, and having a first outboard surface disposed at a first upward flange angle with respect to the web at a bottom side and a top side of the wedge frame; and an aft outboard flange extending laterally away from the outboard end of the web towards the aft distal edge, and having a second outboard surface disposed at a second upward flange angle with respect to the web at the bottom side and the top side of the wedge frame.

\* \* \* \* \*